Feb. 4, 1969  F. BEVILACQUA  3,425,903
NUCLEAR POWER PLANT PROTECTIVE SYSTEM
EMPLOYING LOGIC MATRICES
Filed Sept. 15, 1967  Sheet 1 of 5

INVENTOR
FRANK BEVILACQUA
BY John F. Carney
ATTORNEY

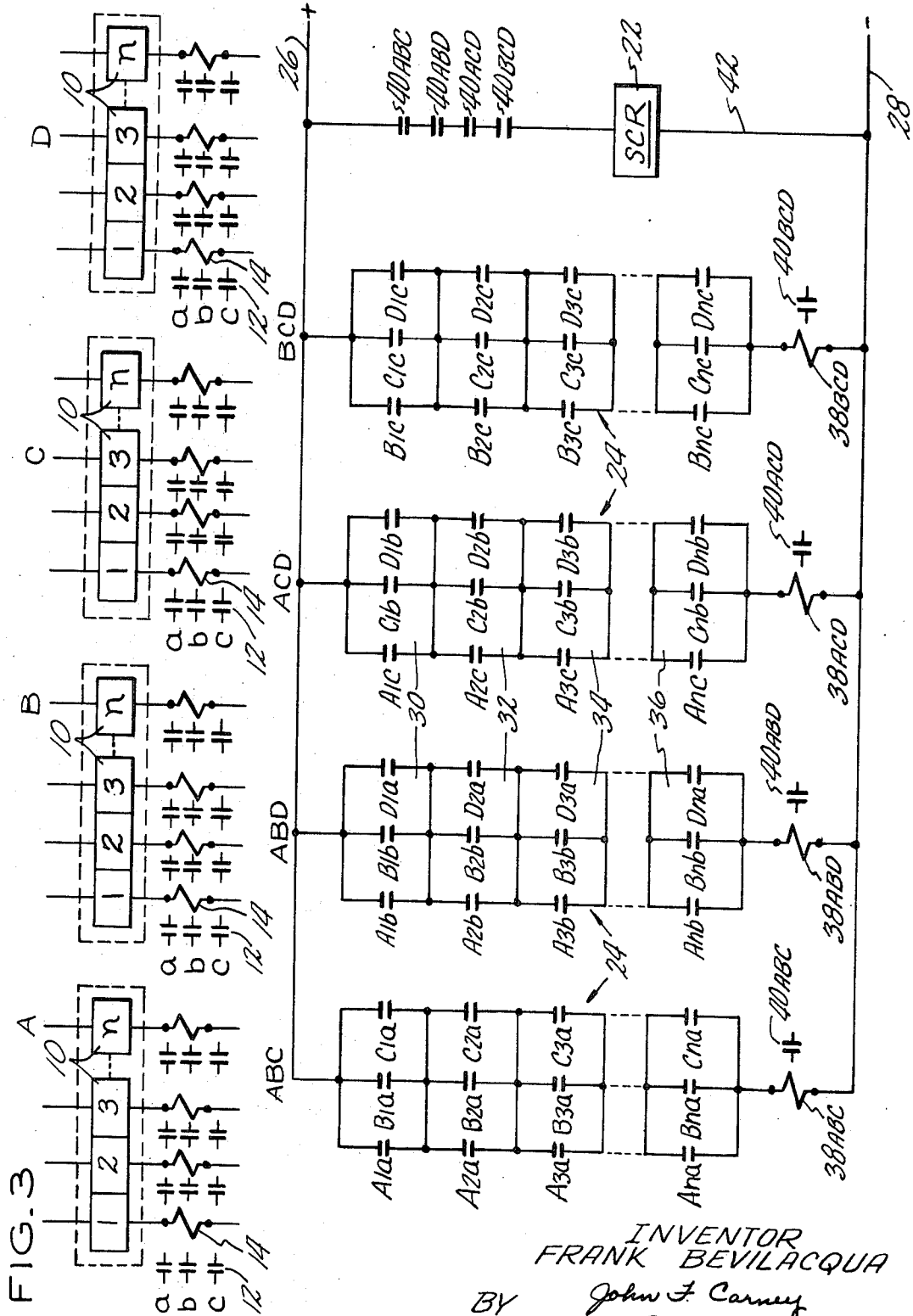

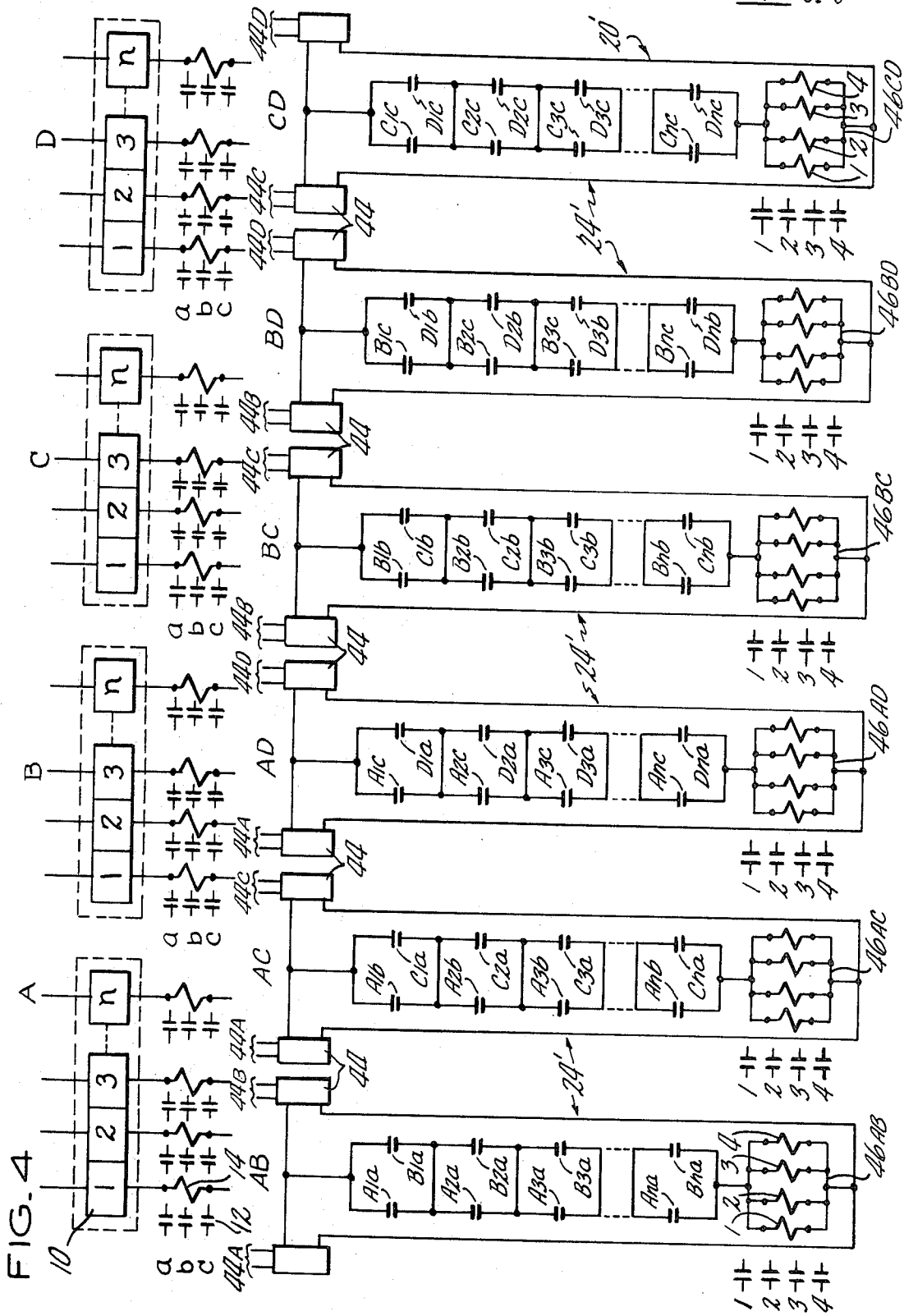

United States Patent Office 3,425,903
Patented Feb. 4, 1969

3,425,903
NUCLEAR POWER PLANT PROTECTIVE SYSTEM EMPLOYING LOGIC MATRICES
Frank Bevilacqua, Windsor, Conn., assignor to Combustion Engineering, Inc., Windsor, Conn., a corporation of Delaware
Filed Sept. 15, 1967, Ser. No. 667,908
U.S. Cl. 176—20                                    10 Claims
Int. Cl. G21c 7/00, 17/00; H02h 5/04

ABSTRACT OF THE DISCLOSURE

A nuclear reactor safety control system wherein a plurality of independent sensing devices are employed to monitor each of a number of reactor operating variables operative to terminate operation of the reactor whenever at least a plurality of the sensing devices associated with any one variable simultaneously respond to a preset condition of the monitored variable.

Background of the invention

It is imperative, in order to prevent accidents of calamitous proportions, to provide nuclear plants with safety systems that are capable of immediately responding to deviations from safe operation of the plant and to terminate operation of the reactor whenever such deviations occur. Such systems must contain a high degree of reliability and must be so designed that their function will not be prevented by occasional system component malfunctions. In keeping with this, it is well known to provide a plurality of sensing devices for monitoring each of the several operating variables of a nuclear plant and to arrange them such that each is independently capable of terminating reactor operation upon responding to a preset condition. Such practice, while possessing a high degree of reliability, is undesirable due to the fact that it can easily result in the needless shutdown of a nuclear plant whenever one of the sensing devices is spuriously actuated or as a result of sensor malfunction.

In order to remedy such deficiencies in nuclear plant safety control systems while at the same time retaining a high degree of system reliability, contemporary practice provides for the safety control systems being arranged such that operation of the reactor will be terminated only when a predetermined plurality of the sensing devices simultaneously respond to a deviation from safe plant operation. Some well-known systems are so ararnged that contacts operated by sensing devices monitoring each of the respective plant variables are connected in series with a number of lines corresponding to the number of sensors monitoring each variable. Each of the lines contains a series-connected relay with the contacts operated by the respective relays being arranged in a matrix which is actuable to shut down the reactor whenever a predetermined proportion of contacts, commonly two out of three, are actuated. Such an arrangement, while requiring the simultaneous response of more than one sensing device to shut down the reactor, suffers from the deleterious effect of being capable of terminating reactor operation when single sensing devices monitoring different plant variables respond simultaneously, thereby resulting in a needless shutdown.

Other safety control systems have been proposed that are operative to insure that reactor operation is terminated only when a plurality of sensing devices monitoring the same plant variable simultaneously respond to an indication of a deviation from safe plant operation. In these systems, the respective sensing devices each actuate a plurality of contacts with the contacts being arranged in matrices, the branches of which contain all possible combinations of sensing devices. The matrices are each adapted to actuate a series-connected relay whose contacts are arranged in a separate matrix operable to terminate reactor operation whenever two out of three, for example, of the relays are actuated. These systems have the disadvantage of being relatively complex in arrangement and expensive to fabricate due to the large number of components that comprise the system. This design has the further disadvantage of being relatively inflexible in that a considerable amount of system alteration is required to expand the system such that it can operate with a greater number of sensing devices monitoring each plant variable and/or it can function to produce the desired effect upon response from a greater number of sensing devices.

Summary of the invention

The present invention is therefore directed to a nuclear reactor safety control system that avoids the above-mentioned disadvantages by providing a relatively simple arrangement of matrix circuits permitting high reliability of the actuation of the reactor protective function and at the same time being capable of preventing needless reactor shutdown in case of occasional component malfunction or of spurious sensor actuation.

According to the invention a control circuit is provided that contains a plurality of parallelly-arranged matrices, each comprised of a number of series-connected branches, which, in turn, contain a number of parallelly-connected contacts operated by the respective sensing devices employed to monitor each of a number of separate plant variables. Relay means operative to terminate operation of the reactor by actuating a control rod scram controller are connected in seires with each matrix and are operable in response to the actuation of an appropriate number of contacts as determined by their arrangement in the respective matrices. The control circuit is arranged such that the number of branches in each matrix corresponds to the number of separate plant variables being monitored; the number of parallelly-connected contacts in each branch corresponds to the number of sensing devices whose response to a deviation from safe operating conditions is required in order that the operation of the reactor be terminated; and the number of matrices employed in the control circuit corresponds to the number necessary to produce all required logic combinations of sensing devices monitoring the same variable.

Description of the drawings

FIGURE 3 is a schematic diagram of a system similar to those of FIGURES 1 and 2 but employing a three-out-of-four actuation logic; and FIGURES 4 and 4a are schematic diagrams of a modified nuclear reactor safety control system similar to that of FIGURE 2.

Description of the preferred embodiment

Figure 1:
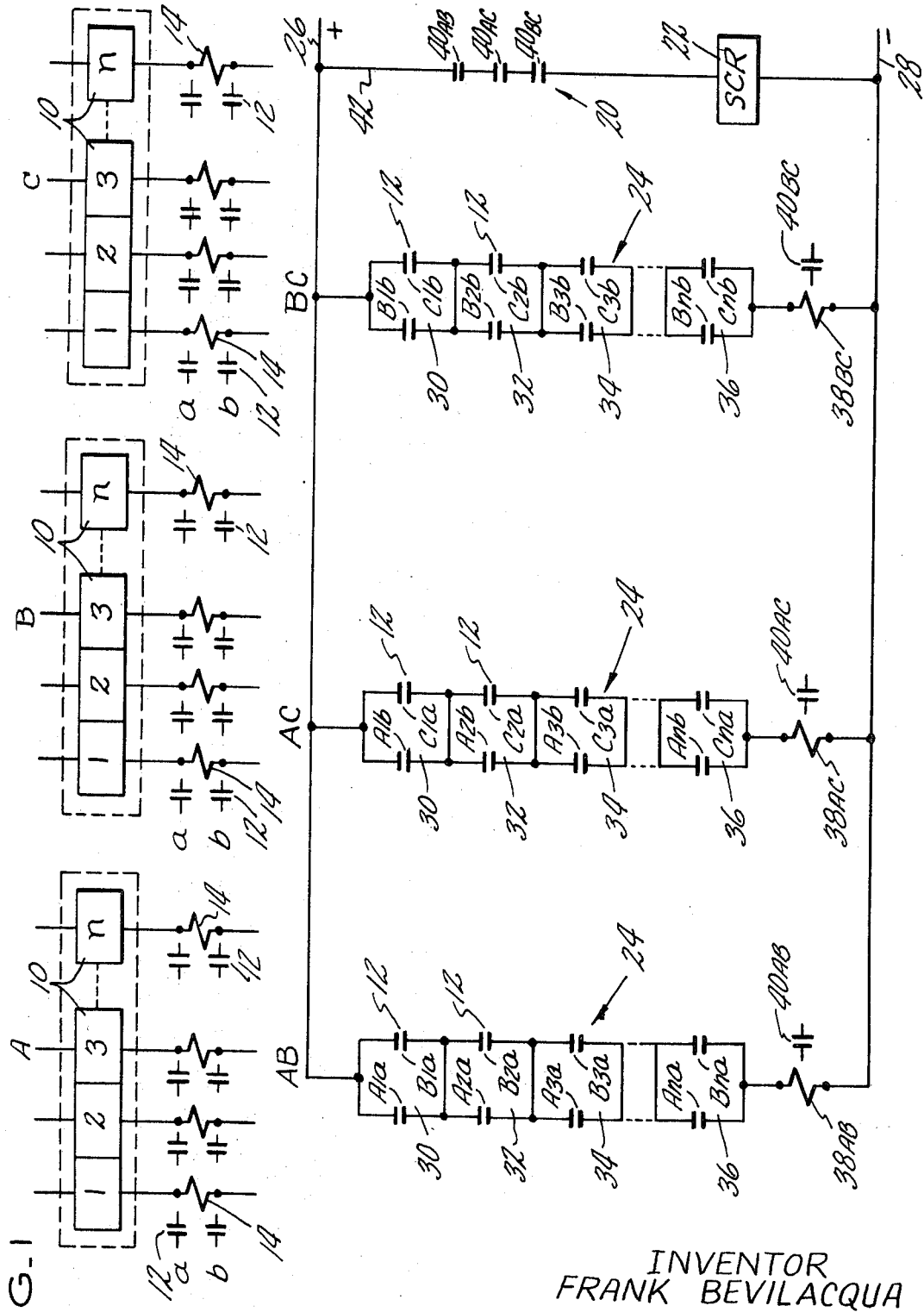
FIGURE 1 is a schematic diagram of a nuclear reactor safety control system according to the present invention employing a two-out-of-three actuation logic.

In the figures there are shown several basically similar embodiments of a nuclear reactor safety control system according to the present invention. The safety control system is operative to monitor each of the many operating variables of a nuclear reactor utility plant and to suspend operation of the reactor whenever any one of the variables exhibits a condition that is determined to be dangerous to plant operation. Some of the variables that may be monitored by appropriate sensing devices in a typical plant are as follows: primary coolant flow; pressure in the pressurizer; water level in the steam generator; presence of load; condition of neutron flux; etc. The present system employs redundant instrumentation in that a plurality of sensing devices indicated as 10 in the drawings are arranged to independently monitor each of the respective variables. This is conventional practice as it is imperative that a malfunction in one of the components not prevent function of the reactor safety system. The sensing devices 10 each have a plurality of contacts 12 associated therewith which are actuated by a relay coil 14. As an alternative arrangement in order to obtain operational independence each contact 12 can be arranged to be operated by a single independent relay. The contacts 12 are normally open contacts and the relay coils 14 are generally energized during reactor operation to close the contacts such that the system operates in accordance with a fail-safe principle. In operation, each sensing device 10 is arranged to de-energize its associated relay coil 14 upon the monitored variable exhibiting a preset condition, which condition is determined to be undesirable for safe reactor operation.

In the diagram embodied in the drawings, the sensing devices 10 are grouped in a plurality of channels which, while being the preferred arrangement for reasons hereinafter explained, facilitates identification of the respective components. Each sensing device 10 is identified by the variable that it monitors with each of the respective variables being indicated by a single-digit numeral 1, 2, 3 . . . n. For example, those sensing devices monitoring low primary coolant flow are designated 1, high pressure in the pressurizer 2, and low pressure in the pressurizer 3. Apparatus for monitoring only three variables are illustrated in the diagram for the sake of brevity. It is to be understood, however, that any number of variables can be monitored as indicated by the sensing devices identified as n. The respective channels into which the sensing devices are grouped are indicated by appropriate upper-case letters A, B, C, D, etc. Here too, any number of channels can be employed depending upon the number of sensed devices selected to monitor each variable. The individual sets of contacts 12 associated with each sensing device 10 and operatively connected with each relay 14 are indicated by lower-case letters $a$, $b$, $c$, etc., the number of contacts employed being determined by the number of matrices that comprise the control circuit of the system. Thus as the description proceeds, each of the components of the system can be identified according to the channel and variable with which it is associated. Thus, contacts A1$a$ shown in the disclosed control circuits are the first set of contacts $a$ associated with the sensing device monitoring low coolant flow 1 in the first channel A.

According to the invention, the nuclear reactor safety control system is provided with a control circuit 20 operative to actuate mechanism, indicated generally as the control rod scram controller 22, that is effective to drop the control rods of the reactor into their fully-extended position within the reactor core, thereby terminating operation of the reactor. Such a controller is shown in some detail in FIGURE 4$a$. Stated generally, the control circuit 20 is an arrangement of the contacts 12 actuated by the respective sensing devices 10 so arranged that the control rod scram controller 22 will be actuated only when a predetermined number of sensing devices monitoring each variable respond to a preset indication of a deviation from safe reactor operation. In order to actuate the control rod scram controller 22, sensing devices 10 monitoring the same variable must be simultaneously actuated to thereby prevent needless shutdown of the reactor as was possible in systems of the prior art when the malfunction or spurious actuation of sensing devices monitoring separate variables were effective to terminate reactor operation.

Referring now to FIGURE 1, there is illustrated a diagrammatic representation of a control system employing three sensing devices 10 to monitor each of a number of variables 1, 2, 3 . . . n and effective to terminate operation of the reactor whenever any two of the three sensing devices monitoring any one variable are actuated. The sensing devices 10 are shown as being grouped in channels A, B, and C, with each channel containing a plurality of sensing devices with each monitoring one of the separate variables. Two contacts 12 are associated with each sensing device to be operated thereby and are respectively identified as contacts $a$ and $b$. The contacts 12 which are normally open contacts are actuated to a closed position by the energization of relay coils 14 whenever the reactor is placed in operation. Thus, the contacts 12 can be actuated to an open position by de-energization of their respective relay coils as will occur when the sensing device operating each responds to a preset condition in the variable being monitored.

The control system includes a control circuit 20 comprising a number of similar series-parallel connections of contacts 12 operated by the various sensing devices 10 and arranged in matrices 24 that are shown as being connected in parallel across power leads 26 and 28. Each matrix 24 contains a number of series-connected branches, indicated as 30, 32, 34, and 36, each consisting of parallelly-connected pairs of contacts operated by sensing devices monitoring the same variable. As shown, each matrix 24 is identified by a combination of upper-case letters that correspond to the channels with which the contacts of each branch are associated. Thus, matrix AB contains branches 30 through 36 consisting of contactss' A1$a$ and B1$a$, A2$a$ and B2$a$, A3$a$ and B3$a$ and and A$na$ and B$na$ operated by the sensing devices grouped in channels A and B. Similarly, matrix AC contains branches 30 through 36 consisting of contacts A1$b$ and C1$a$, A2$b$ and C2$a$, A3$b$ and C3$a$, and A$nb$ and C$na$ operated by sensing devices grouped in channels A and C. And likewise, for matrix BC which contains contacts operated by sensing devices grouped in channels B and C.

Connected in series with each matrix 24 is a relay coil 38 adapted to operate an associated set of contacts 40. The respective relay coils 38 and contacts 40 are identified in the drawings by subscripts that correspond to the appropriate matrix with which each is associated. The contacts 40 are series-connected in a line 42 containing the control rod scram controller 22 such that actuation of any one of the contacts 40 is effective to actuate the controller.

The operation of the control system of FIGURE 1 is as follows. When the nuclear power plant is placed in operation, the relay coils 14 associated with all of the sensing devices 10 are energized to thereby close the associated contacts 14 that are arranged in the matrices 24 comprising the control circuit 20. The relay coils 40 connected in series with each of the matrices 24 are therefore energized to close their associated contact 42. Should one of the variables exhibit a condition that deviates by a predetermined amount from a safe operating condition, for example the primary coolant flow drops below the flow limit set for the actuating device 10 monitoring that variable, all of the sensing devices A1, B1, and C1 will be actuated to de-energize their relay coils 14, thereby opening the contacts $a$ and $b$ associated with each. Thus the contacts A1$a$, A1$b$, B1$a$, B1$b$, C1$a$ and C1$b$ in the branches 30 of the matrices 24 that comprise the control circuit 20 will be opened. In this case, the current path across each of the matrices AB, AC, and BC will be broken thereby de-energizing all of the relays 38$_{AB}$, 38$_{AC}$, and 38$_{BC}$ and opening contacts 40$_{AB}$, 40$_{AC}$, and 40$_{BC}$ in line 42, thus actuating the control rod scram controller 22 to terminate operation of the reactor.

Similarly, should only two of the three sensing devices 10 associated with the variable 1 be actuated, as for example if the relay coil 14 associated with one of the sensing devices monitoring that variable (that in channel B, for example) shorted out, the contacts $a$ and $b$ operated by the sensing device indicated as A1 and C1 would be opened. Due to the short, those contacts associated with sensing device B1 would remain closed. Such action would disrupt the current path across matrix AC by the opening of contacts A1$b$ and C1$a$ in branch 30, thereby de-energizing relay coil 38$_{AC}$ and opening contacts 40$_{AC}$ in line 42 to actuate the control rod scram controller 22.

If, however, only one of the sensing devices 10 monitoring this variable (that in channel C, for example) was actuated, either as a result of component malfunction or by receipt of a spurious signal, only contacts A1$a$ and A1$b$ in the control circuit 20 would be opened. Because the branches that comprise each matrix 24 are made up of parallelly-connected contacts the current path through all of the matrices would be undisturbed since the contact B1$a$ in matrix AB and C1$a$ in matrix AC remain closed thereby preventing the de-energization of the affected relay coils 38.

Figure 2:
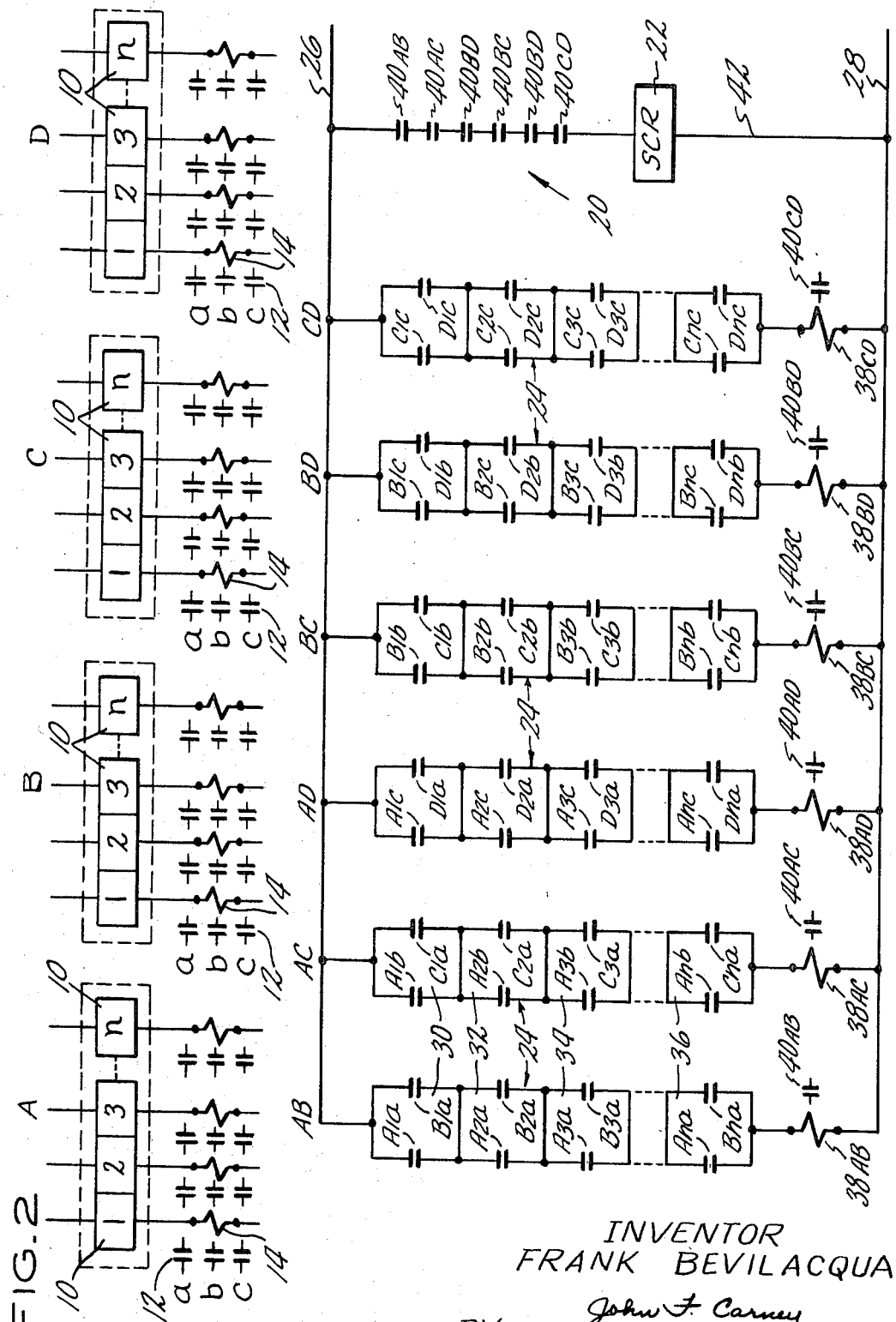
FIGURE 2 is a schematic diagram of a system similar to that of FIGURE 1 but employing a two-out-of-four actuation logic.

In FIGURE 2 there is shown a safety control system embodying the present invention wherein four sensing devices 10 are employed to monitor each variable 1, 2, 3 . . . $n$ and the arrangement of the control circuit is such that actuation of any two of the four sensing devices will actuate the control rod scram controller 22. As shown, the modified system differs from that of FIGURE 1 in that the added sensing devices 10 are grouped in channel D. Since the system employs a "two-out-of" logic similar to that of FIGURE 1 each matrix 24 comprises branches 30 through 36 made up of two parallelly-connected sets of contacts. Due, however, to the presence of an additional channel D, and the "two-out-of-four" logic requirement the number of matrices 24 in the control circuit 20 must be increased from three as in the previous arrangement to six. These are identified as matrices AB, AC, AD, BC, BD, and CD. The number of matrices in this arrangement requires that each sensing device 10 be provided with an additional set of contacts such that, in this arrangement, each relay 14 operates three contacts, $a$, $b$, and $c$. Moreover, the line 42 that contains the control rod scram controller 22 now includes six series-connected contacts 40$_{AB}$, 40$_{AC}$, 40$_{AD}$, 40$_{BC}$, 40$_{BD}$, and 40$_{CD}$ operated by the relay coils 38 connected in series with each of the respective matrices 24.

It should be appreciated that the operation of the control system of this embodiment is substantially identical with that of FIGURE 1, the only difference being that additional current paths defined by the presence of additional matrices are provided to control the actuation of the controller 22. If any two or more of the four sensing devices 10 employed to monitor any one variable are actuated, the current path defined by two or more of the matrices 24 will be disrupted to de-energize the associated relay(s) 38 thereby opening the associated contacts 40 in line 42 to actuate the controller. As long as only one sensing device 10 is actuated, all of the circuit paths defined by the matrix 24 will remain unbroken to prevent actuation of the controller 22 thus permitting operation of the reactor to continue.

The control system illustrated in FIGURE 3 is one incorporating the inventive concept wherein the actuation of three, instead of two, of the four sensing devices 10 of the FIGURE 2 arrangement are required to actuate the control rod scram controller 22. In this embodiment of the invention the channels A, B, C, and D are arranged in an identical fashion to those of the FIGURE 2 arrangement with each channel containing one sensing device 10 for monitoring each of the plant operating variables 1, 2, 3 . . . $n$ and each sensing device operating three contacts $a$, $b$, and $c$. The difference arises, however, in the arrangement of the control circuit 20 where, because the system is designed to function upon the actuation of three sensing devices instead of two, the matrices 24 comprise series-connected branches 30 through 36 that each consist of three parallelly-connected contacts. Because the only possible nonduplicative combinations of the four channels A, B, C, and D in groups of three are ABC, ABD, ACD, and BCD there are four matrices 24 in the circuit, each corresponding to these respective combinations. As before, each matrix 24 terminates in a series-connected relay coil 38 having an associated set of contacts 40. The contacts 40 are series-connected in a line 42 containing the control rod scram controller 22 whereby actuation of any one of the matrix-operated relay coils 38 will effect actuation of the controller.

The modified form of the invention illustrated in FIGURES 4 and 4$a$ is a system substantially the same as that of FIGURE 2 but wherein the control circuit, here indicated as 20′, is arranged for operation off a plurality of independent energy sources. By means of this arrangement reliability of the safety system is increased in that the protective function is not rendered inoperative by failure of one or more energy sources.

Moreover, as best exemplified in this form, the present invention conveniently lends itself to mutual isolation of each of the system components thereby eliminating the possibility of failure of the protective function of the system due to a single malfunction, such as a short circuiting of a portion of the system that could conceivably damage the circuitry of the entire control system were it to be housed within a single enclosure or cabinet structure as has heretofore been the general practice. In the illustrated arrangement each channel A, B, C, and D can be physically isolated from one another as can be each sensing device 10 of which the channels are comprised. Similarly, each matrix conduit 24′ can be arranged in separate isolated compartments or the like.

As shown, each of the matrices 24′ is connected to two independent energy sources 44, which sources can be those that supply power to each of the respective channels A, B, C, and D. Thus, the matrix indicated as matrix AB is connected in parallel between independent power sources 44$_A$ and 44$_B$. Similarly, matrix AC is connected in parallel between independent power sources indicated as 44$_A$ and 44$_C$. The remaining matrices AD, BC, BD, and CD, are similarly connected in parallel between independent power sources. Because electrical energy is supplied to the control circuit in this manner a power failure in one of the sources will not affect the operability of the associated matrices. It should be evident, however, that a power failure in the source that supplied electrical energy to one of the channels A, B, C, or D will cause the contacts 12 associated with all of the sensing elements 10 contained in the affected channel to be actuated to an open position thereby actuating one side of each of the affected matrices. For example, should a power failure occur in the energy source to which channel A is connected, which source also supplies matrices AB, AC, and AD, the matrices AB, AC, and AD would not be rendered inoperative since they also receive power from the power sources 44$_B$, 44$_C$, and 44$_D$ to which channels B, C, and D are respectively connected. Such power failure in channel A would, however, de-energize the relays 14 associated with all of the sensing devices 10 contained in that channel thereby actuating their contacts 12 to an open position. This would result in an opening of the contacts A1$a$, A2$a$, A3$a$, and A$na$ in matrix AB. In matrix AC contacts A1$b$, A2$b$, A3$b$, and A$nb$ would also be opened and so too in matrix AD with contacts A1$c$, A2$c$, A3$c$, and A$nc$. But, although all of these contacts have been actuated, no needless shutdown of the reactor could occur since the contacts associated with the sensing devices in channels B, C, and D would remain closed, thus preventing actuation of the control rod scram controller.

In the arrangement disclosed in FIGURES 4 and 4$a$, this principle of component redundancy is carried still further.

The relay coils 38 connected in series with each of the matrices of FIGURE 2 are replaced by relay groups indicated as 46 and the subscript appropriate to the matrix to which each is connected. Each relay group comprises four parallelly-connected coils each operating an associated set of contacts indicated as 1, 2, 3, and 4 in each group. These sets of contacts are arranged in the circuitry of FIGURE 4a which corresponds to line 42 of FIGURE 2 such that there are now four independent lines operable to actuate the control rod scram controller.

Figure 4A:
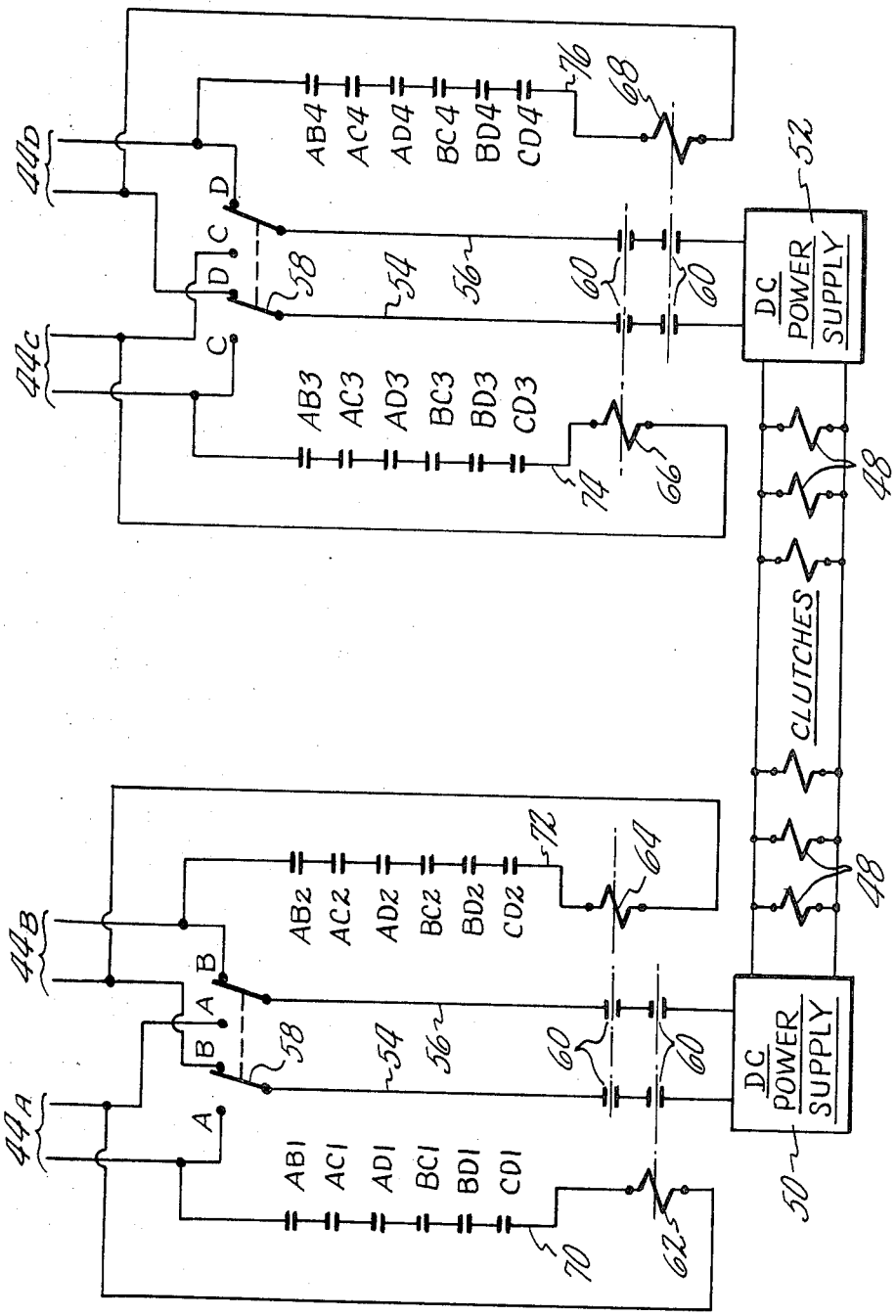

The scram controller and its operating circuitry of FIGURE 4a replaces line 42 in the FIGURE 2 embodiment of the invention and comprises a plurality of control rod closure coils 48 connected in parallel between two independent sources of D.C. power 50 and 52. Each of the D.C. power sources 50 and 52 receives electrical energy from two independent A.C. sources which can be the same power sources supplying the respective channels $44_A$ and $44_B$ in the case of D.C. source 50 and $44_C$ and $44_D$ in the case of D.C. source 52. Connection is made between the A.C. and D.C. power sources by means of lines 54 and 56 through manually actuated double pole-double throw switches 58. The switches 58 enable D.C. sources $44_A$ or $44_B$ and D.C. power source 52 to be alter-power source 50 to be alternatively supplied from A.C. natively supplied from A.C. power sources $44_C$ or $44_D$. Circuit breaking contacts 60 are contained in each of the lines 54 and 56. These are operated by relay coils 62, 64, 66, and 68 contained in lines 70, 72, 74, and 76 which are connected to A.C. sources $44_A$, $44_B$, $44_C$, and $44_D$, respectively. Series-connected in each of the lines 70, 72, 74, and 76 are one set of contacts 1, 2, 3, or 4, operated by each of the coils in each relay group 46 associated with the control circuit matrices. These contacts are identified by their appropriate number together with an appropriate prefix to indicate the matrix with which each set of contacts is associated.

The operation of the scram controller of FIGURE 4a is such that whenever an affected matrix is actuated to de-energize its connected relay group 46 all of the coils in the affected group will be de-energized thereby opening the contacts operated by each. For example, when relay group $46_{AB}$ is actuated to de-energize each of the coils in that group contacts AB1 in line 70, AB2 in line 72, AB3 in line 74, and AB4 in line 76 will be opened to break the line in which each is contained. Breaking lines 70, 72, 74, or 76 causes relays 62, 64, 66 or 68 to be de-energized thus opening contacts 60 that supply A.C. power to the D.C. power supplies 50 and 52 thereby de-energizing all of the clutch coils 48 which in turn causes the control rods operated by each to rapidly fall to their fully extended position within the reactor core, thereby terminating reactor operation. It should be evident that, by means of the disclosed system, as long as one of the D.C. power sources 50 or 52 are in service the control rod scram controller can function.

It should thus be appreciated that, by means of the present invention, there is provided a novel nuclear reactor safety control system that is characterized by simplicity of design and reliability of operation. Because of the particular arrangement of sensor-actuated contacts in the control circuit, actuation of the protective function of the system is assured in all cases warranting such actuation and prevented in those cases that would otherwise result in needless shutdown of the reactor. Moreover, safety control systems constructed according to the present invention are characterized by flexibility of design in that any number of plant operating variables can be accommodated simply by providing an increasing number of branches in each of the matrices of the control circuit. Such systems can further provide for alterations in the actuation logic by providing for the actuation of any number of sensing devices to be required for initiating the protective function. This is accomplished simply by increasing the number of parallelly-connected contacts that comprise each of the matrix branches.

It will be obvious to those skilled in the art that the present invention is not restricted to the nuclear reactor art but may be useful in other applications requiring similar safety provisions. It will also be obvious to those skilled in the art that although an embodiment of the invention has been shown in detail, various changes in the details, materials and arrangements of parts which have been herein described and illustrated in order to explain the nature of the invention may be made by those skilled in the art within the principle and scope of the invention as expressed in the appended claims.

What is claimed is:

1. In apparatus wherein a plurality of sensors are employed to monitor each of a number of separate variables, a control system operative to produce a desired effect upon the occurrence of a predetermined plurality of sensors monitoring any single variable responding to a preset condition in the associated variable, said control system including:
   (a) a plurality of sensors for monitoring each of said variables, each of said sensors being capable of independently responding to its associated variable;
   (b) switch means operated by each of said sensors and operative to actuate a plurality of contacts upon response to a preset condition by the associated sensor;
   (c) a control circuit comprising:
      (i) a plurality of parallelly-related matrices each containing a number of serially-connected branches corresponding to the number of variables being monitored,
      (ii) said branches each consisting of a number of parallelly-connected contacts operated by separate sensors monitoring the same variable, the number of contacts contained in each of said branches corresponding to the number of sensors whose response is required to produce the desired effect,
      (iii) and relay means operatively connected to each of said matrices and operable to produce the desired effect upon actuation of the associated matrix.

2. A control system according to claim 1 wherein said relay means comprises:
   (a) first relay means connected in series with each of said matrices and each being operative to actuate an associated contact;
   (b) and second relay means operable to produce the desired effect operatively connected with the contacts actuated by each of said first relay means to be actuated upon actuation of any one of said contacts.

3. A control system according to claim 1 wherein said contacts are actuable to an open position in response to the actuation of the respective switch means.

4. A control system according to claim 3 wherein said relay means comprises:
   (a) a first relay connected in series with each of said matrices and each being operative to actuate an associated contact;
   (b) a line containing each of said first relay contacts connected in series;
   (c) a second relay connected in said line in series and actuable upon actuation of any one of said contacts.

5. A control system according to claim 1 wherein:
   (a) said sensors are arranged in groups each containing one sensor monitoring each variable;
   (b) and the number of parallelly-related matrices corresponds to the number required to produce all possible group combinations.

6. A nuclear reactor safety control system wherein a plurality of sensors are employed to monitor each of a plurality of independent plant operating variables, said control system being operative to terminate operation of the reactor upon the occurrence of a predetermined plurality of sensors monitoring any single variable responding to a preset condition in the associated variable, said control system including:
(a) means for terminating reactor operation;
(b) a plurality of sensors capable of independently responding to the same variable;
(c) switch means associated with each of said sensors and operative to actuate a plurality of closed contacts to an open position upon responding to a preset condition;
(d) a control system comprising:
 (i) a plurality of parallelly-related matrices each containing a number of series-connected branches corresponding to the number of separate variables being monitored;
 (ii) said branches each consisting of a number of parallelly-connected contacts operated by said switch means associated with separate sensors monitoring the same variable, the number of contacts contained in each of said branches corresponding to the number of sensors whose response to a preset condition is required to terminate operation of the reactor;
 (iii) and relay means operatively connected to each of said matrices and operable to actuate said reactor operation terminating means.

7. A control system according to claim 6 wherein said relay means comprises:
(a) first relay means connected in series with each of said matrices and each being operative to actuate an associated contact;
(b) second relay means operably connected to said reactor operation terminating means and with the contacts actuated by each of said first relay means to be actuated upon actuation of any one of said contacts.

8. A control system according to claim 7 wherein said relay means comprises:
(a) a first relay connected in series with each of said matrices and each being operative to actuate an associated contact;
(b) a line containing each of said first relay contacts connected in series;
(c) a second relay series connected in said line and actuable upon actuation of any one of said contacts, said second relay being operable to actuate said reactor operation terminating means.

9. A control system according to claim 6 wherein:
(a) said sensors are arranged in mutually isolated channels each containing one of the sensors monitoring each of said variables;
(b) and the number of parallelly-related matrices corresponds to the number required to produce all possible channel combinations.

10. A control system according to claim 6 wherein said matrices are operably connected to independent energy sources.

References Cited

UNITED STATES PATENTS
2,973,458   2/1961   Nye _____ 317—31

FOREIGN PATENTS
219,171   1/1962   Austria.

OTHER REFERENCES
AEC Document AECL–799 (1959), pp. 7–4 and 7–5 of an article by Laurence.

J. British Nuclear Energy Soc., pp. 74–76, January 1963, part of article by A. H. Weaving et al.

REUBEN EPSTEIN, *Primary Examiner.*

U.S. Cl. X.R.
317—9, 40